Feb. 28, 1961

T. H. THOMPSON 2,973,015

BELLOWS STRUCTURE

Filed Oct. 26, 1959

INVENTOR.
TOM H. THOMPSON
BY
Alfred C. Wilson
ATTORNEY

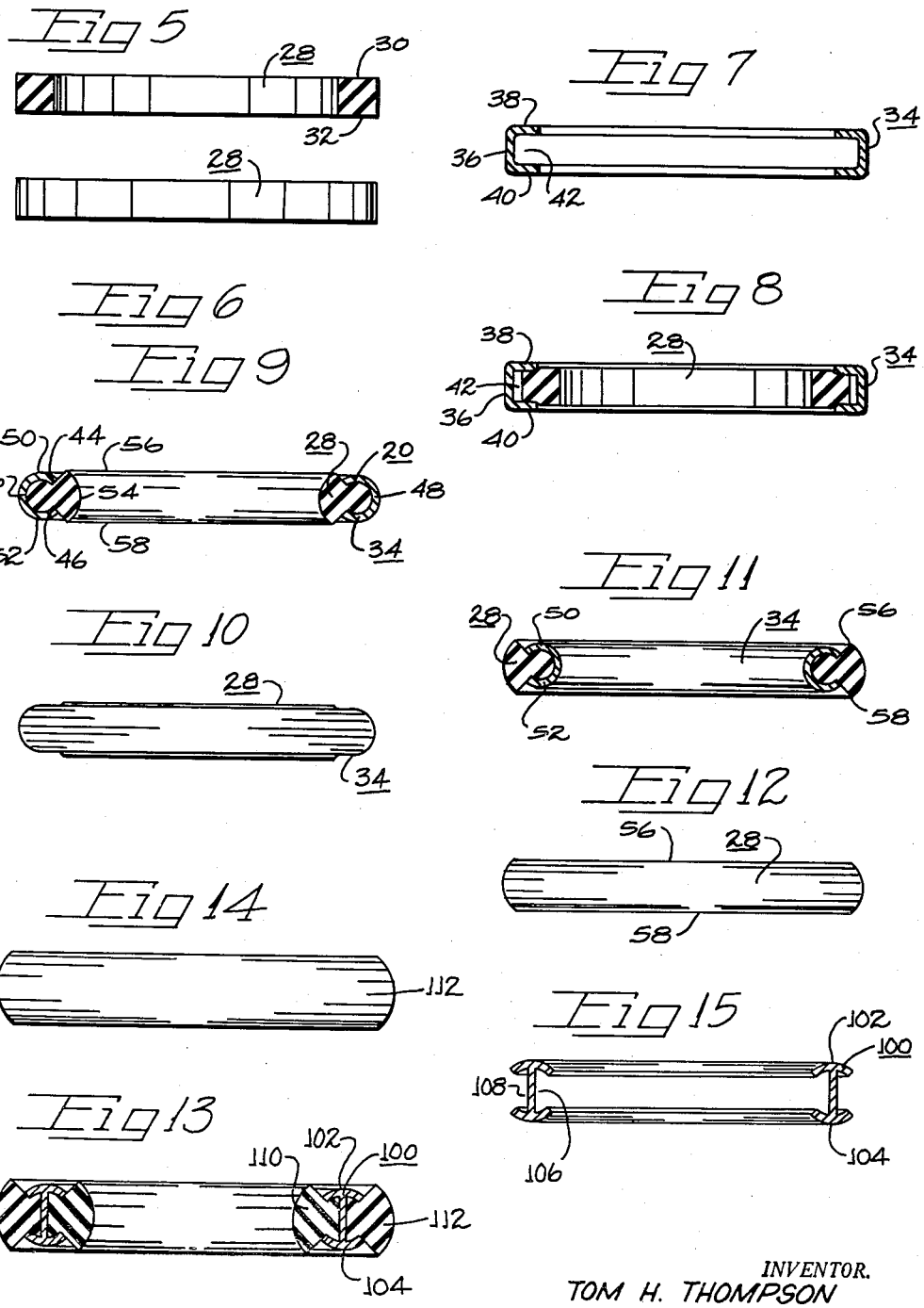

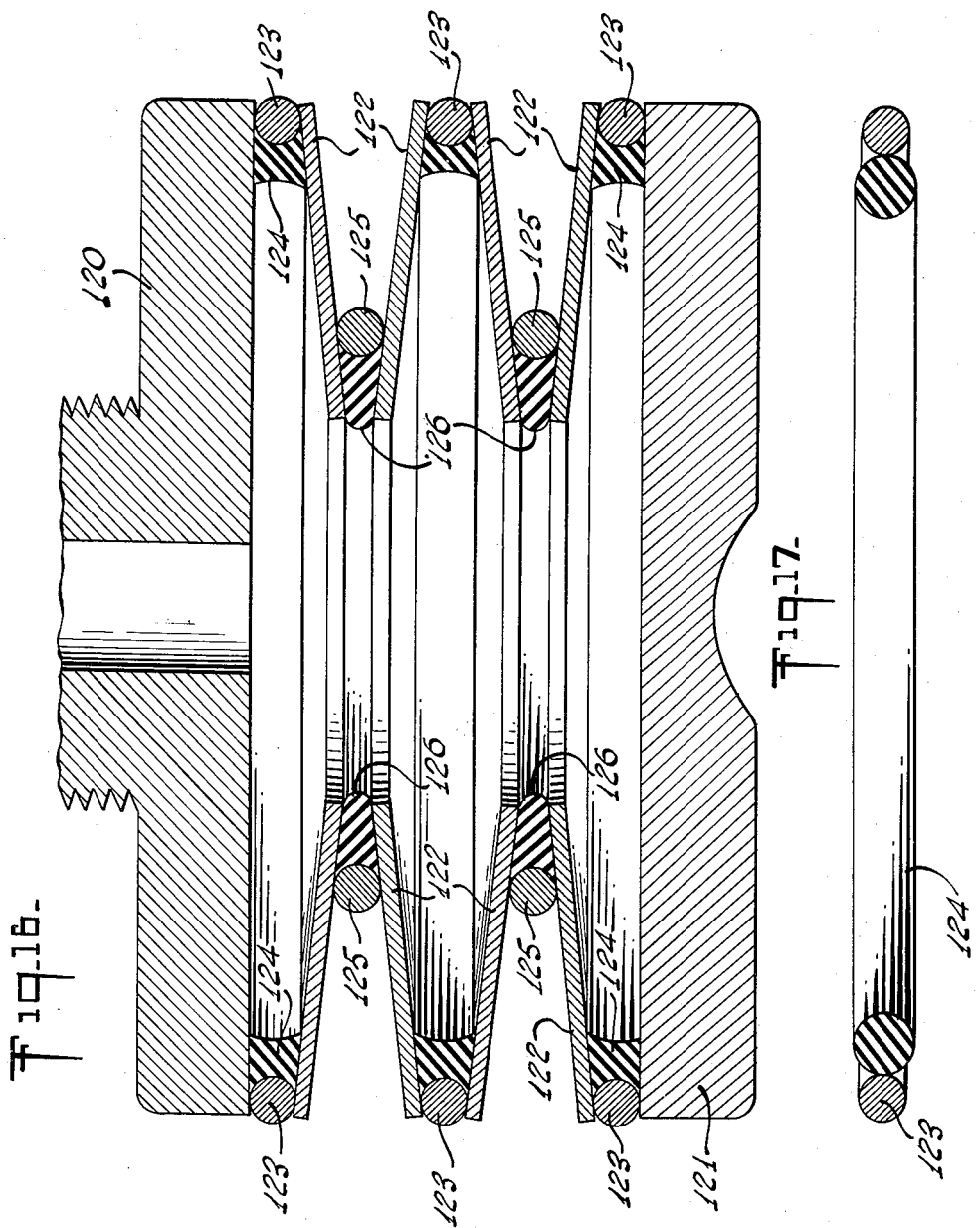

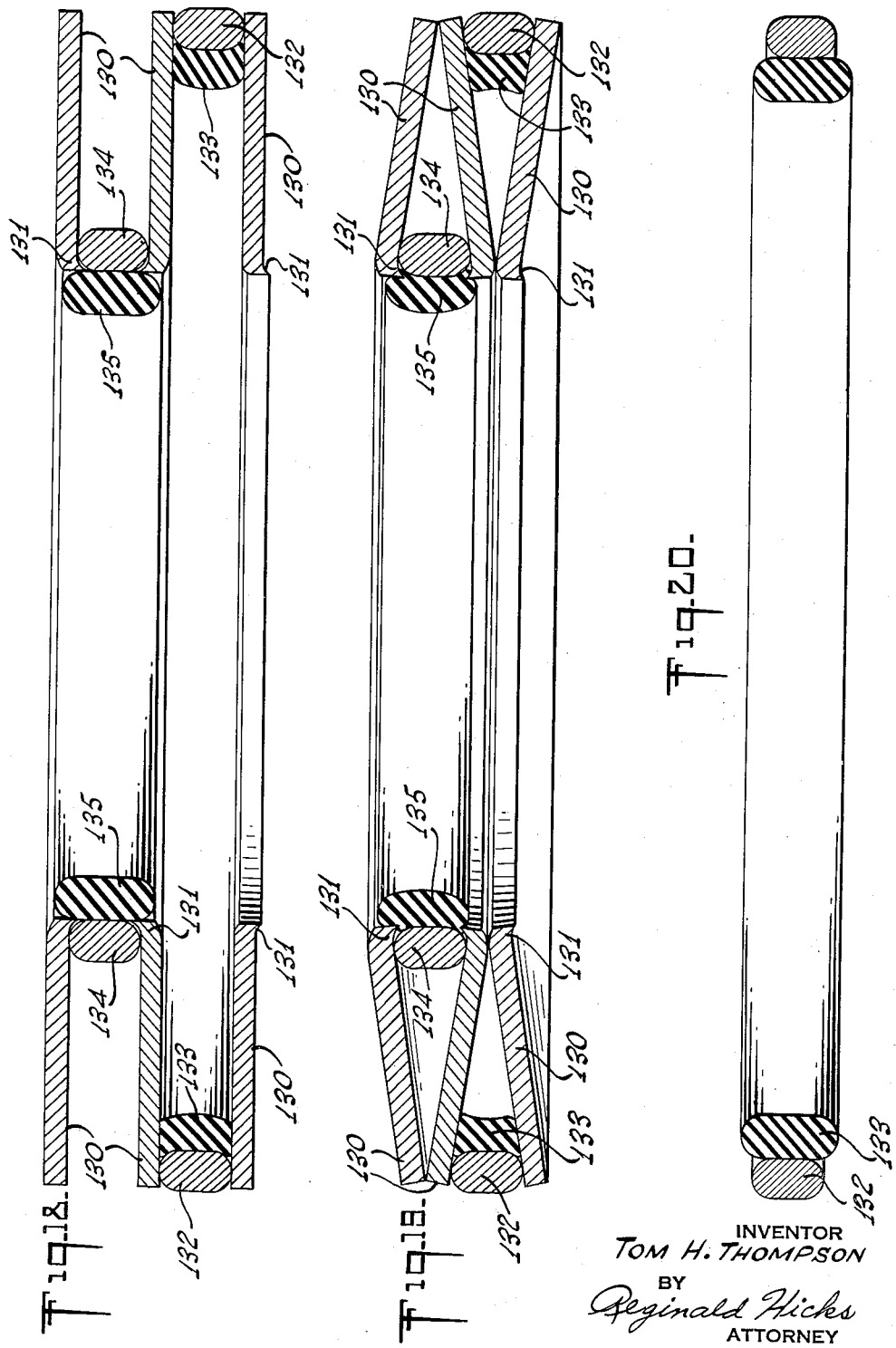

United States Patent Office 2,973,015
Patented Feb. 28, 1961

2,973,015

BELLOWS STRUCTURE

Tom H. Thompson, Daytona Beach, Fla., assignor to Sabre Research Corporation, Daytona Beach, Fla., a corporation of Florida Filed Oct. 26, 1959, Ser. No. 848,865

14 Claims. (Cl. 137—796)

This is a continuation-in-part of my copending applications Serial Numbers 698,847 and 807,510, filed November 25, 1957, and April 20, 1959, respectively, both now abandoned.

The invention has to do with the construction of bellows devices useful for transmitting motion and for other purposes and of the type in which the body portion of the bellows consists of a plurality of washer members disposed one above the other, with means for sealing the outer and inner peripheries, alternately, of adjacent pairs of washers to form a fluid-tight chamber the capacity or volume of which is expanded and contracted, respectively, as the washer members are deflected axially away from and toward one another.

Among the objects of the invention are the provision of an improved bellows of this type, simplification of the structure and its assembly and increasing the useful life of the device, while holding its costs to a minimum.

In general, the bellows of the invention includes the combination of a pair of washer members disposed one above the other; a concentric, intervening, load supporting ring of substantially incompressible material having a cross section presenting upper and lower surfaces abutting the opposed faces of the washer members adjacent a periphery of one of them and the corresponding periphery of the other; and a sealing ring of resilient material disposed adjacent and concentrically with the load supporting ring and having upper and lower portions abutting the said opposed faces of the washer members, the said upper and lower portions of the sealing ring, in the relaxed state of such ring, protruding above and below the said upper and lower surfaces of the load supporting ring whereby, when the washers are deflected axially toward one another, with their said opposed faces abutting the upper and lower curved surfaces of the load supporting ring, the sealing ring is compressed. This condition, it will be understood, obtains throughout the working cycle of the bellows and it will be recognized that the arrangement provides what, in effect, are separate load supporting and sealing components, each especially adapted and suitable for performing its particular function but acting in concert to satisfy the needs of the structure in a simple and effective manner.

The other periphery of one of the washers of such a pair and the corresponding periphery of an adjacent washer may be spaced and sealed by similar components (or in other suitable ways, as will presently appear) and the stack of washers and rings expanded to whatever total number is appropriate for the work to be performed.

Other features, objects and advantages of the invention will be apparent from the following description of various forms which it may take and from the accompanying drawings, in which:

Figs. 5 and 6 are sectional and elevational views illustrating the sealing member or ring of the foregoing form of the invention;

Fig. 7 is a sectional view illustrating the load carrying member or ring of such form, in an intermediate stage in its formation;

Fig. 8 is a sectional view illustrating the sealing ring of Figs. 5 and 6 assembled in the load carrying ring of Fig. 7;

Fig. 9 is a sectional view illustrating the sealing and load supporting members or rings secured together by compressing the load supporting member into clamping engagement with the sealing member;

Fig. 10 is an elevational view of the assembly illustrated in Fig. 9;

Figs. 11 and 12 are sectional and elevational views similar to Figs. 9 and 10 illustrating an assembly wherein the sealing member is radially outside of the load supporting member, for use in a bellows construction wherein the interior of the assembly is subjected to less than atmospheric pressure;

Figs. 13 and 14 are sectional and elevational views combining the features of Figs. 9 to 12, sealing means being positioned on both the inner and the outer sides of the load carrying member; and Fig. 15 is a sectional view of a contoured load carrying member shaped to engage and hold the inner and outer sealing members.

Fig. 16 is a sectional view of a modification;

Fig. 17 is a sectional view of the outer, load supporting and sealing members of the Fig. 16 form;

Fig. 18 is a sectional view of a portion of another modification;

Fig. 19 is a sectional view of the same modification but showing the washers in their fully deflected position; and Fig. 20 is a sectional view of the outer, load supporting and sealing members of the form shown in Figs. 18 and 19.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
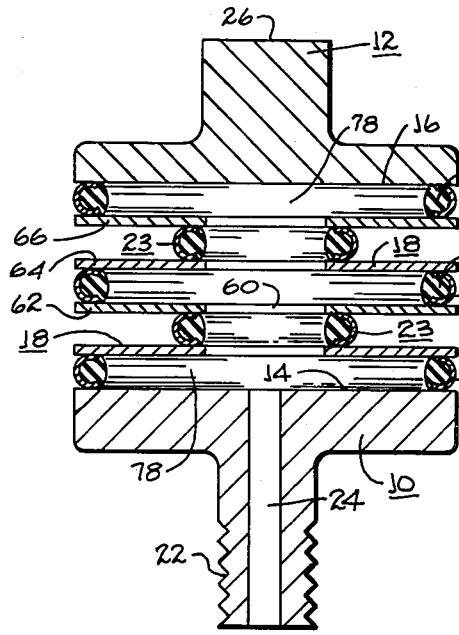
Figure 1 is a sectional view showing my improved load supporting and sealing components in a preferred form, interposed between flat washer type members assembled together to provide a bellows construction, the assembly being shown in an unstressed position.

Referring now more particularly to Fig. 1, it will be noted that end plate members 10 and 12 have substantially flat confronting inner surfaces 14 and 16 between which the bellows construction formed of a plurality of washers 18 separated by load supporting and sealing assemblies 20 are interposed.

The end plate 10 may be mounted on any suitable support member, and is preferably provided with a threaded shank 22 having a fluid port 24 communicating with the space within the bellows defined by the washer members 18, the load supporting and sealing assemblies 20 and the end plate 12. The end plate 12 may be provided with a plunger 26 adapted to engage a member to be moved.

My improved load supporting and sealing assemblies 20 may be formed as illustrated in Figs. 5 to 15. The sealing member 28 shown in Figs. 5 and 6 may be formed in any desired manner as by providing parallel cuts through a tube of neoprene or other suitable resilient material to provide substantially parallel upper and lower surfaces 30 and 32.

As illustrated in Fig. 9, the load carrying ring or member 34 in this preferred form is of hollow section with an open side making it more or less C-shaped. It may be formed in any convenient manner, as from a tube of metal sliced off and deformed to provide an outer wall 36 and axially spaced inwardly directed flanges 38 and 40 defining therebetween a groove 42. As shown in Fig. 8 the sealing ring member 28 of the type shown in Figs. 5 and 6 is assembled with the load carrying member 34 by inserting the outer edge of the sealing member into the groove 42 between the radially inwardly directed walls 38 and 40. As shown in Fig. 9 the load carrying member 34 is then deformed as by a press operation to deflect inwardly toward each other, the radially inwardly directed walls 38 and 40 into enveloping clamping engagement with the sealing ring member 28. The outer wall 36 of the load carrying member 34 is contoured angularly and rounded as shown at 48. As the deforming operation is performed on the load carrying member 34 it will be noted that the distance between the outer edges of the inwardly directed walls 38 and 40 is decreased as the member 34 is contoured to provide curved upper and lower load carrying surfaces 50 and 52.

As the inner edges 44 and 46 of the load carrying member 34 engage and compress the sealing ring member 28, the inner portion 54 of the ring 28 is expanded radially as viewed in Fig. 9 to provide upper and lower sealing surfaces 56 and 58, which in the relaxed (Fig. 9) state of the sealing ring, protrude above and below the upper and lower load carrying surfaces 50 and 52 of the load carrying member 34.

Figure 2:
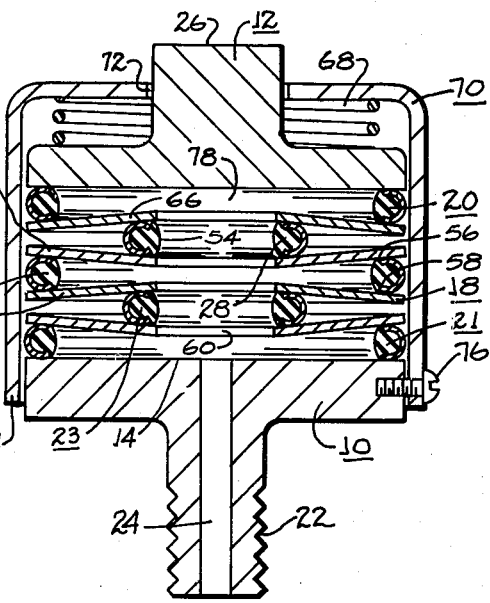
Fig. 2 is a view similar to Fig. 1 illustrating the assembly positioned within a casing and shown in a partially deflected, pre-loaded position.

Fig. 2 illustrates the bellows construction in the fully assembled position and subjected to the normal pre-load force. In assembling this bellows construction an outer large diametered load supporting and sealing assembly 21 is positioned on the inner surface 14 of the end plate 10. A washer 18, in this instance of the substantially flat type is positioned on the outer load supporting and sealing assembly 21. It will be noted that the lower and upper seating surfaces 58 and 56 of the sealing ring member 28 engage the surface 14 of the end plate 10, and the lower surface of the washer 18 respectively adjacent its outer periphery. In this position the rounded lower and upper load carrying surfaces 52 and 50 of the load carrying member 34 are spaced slightly from the surface 14 of the end plate 10 and the surface of the washer 18 respectively. An inner load supporting and sealing assembly 23 of a lesser diameter is proportioned to position its lower sealing surface 58 of the sealing ring member 28 in engagement with the radially inner upper surface of the washer member 18 which was first positioned on the surface 14 of the member 10. A second washer member 62 similar to the aforementioned washer 18 is then positioned in place with its radially inner lower surface adjacent the central aperture 60 therein engaging the upper sealing surface 56 of the sealing ring member 28.

Another large diametered load supporting and sealing assembly 21 is next positioned on the second washer 62 in the manner previously described. A third washer 64 also similar to the washer 18 is next positioned on the outer assembly 21, and another inner load supporting and sealing assembly 23 is mounted thereon. Still another washer member 66 is then positioned on the inner assembly 23, and an outer assembly 21 is positioned adjacent its outer periphery and the end plate 12 is next assembled. With the parts assembled as shown in Fig. 1, a spring 68 shown in Fig. 2 is positioned on the end plate 12 surrounding the plunger 26. A cup member or housing 70 having a central aperture 72 therein to accommodate the plunger 26 may be telescoped over the assembly thus formed, and the assembly may be compressed by applying pressure to force the lower open end 74 of the cup 70 down over the end plate 10 to align apertures in the cup 70 and in the outer periphery of the end plate 10 for the reception of screws 76 or other fasteners to maintain the parts in assembled relation. The spring 68 applies a desired degree of pre-loading to the load supporting and sealing assemblies 20 whereupon the upper and lower sealing surfaces 56 and 58 of the sealing ring members 28 are flattened into suitable sealing engagement with the contacted surfaces of the washer members and end plates. The rounded upper and lower load carrying surfaces 50 and 52 of the load carrying members 34 are then in contact with the adjacent surfaces of the washers 18, and the inner surfaces 14 and 16 of the end plates 10 and 12.

It will be apparent that, if desired, the assembly may be treated, as by the application of heat and pressure if desired, to vulcanize the upper and lower sealing surfaces 56 and 58 of the sealing ring member 28 to the contacted surfaces of the washer members 18 and the surfaces 14 and 16 of the end plate assemblies 10 and 12. Where this expedient is resorted to the cup member 70 may be eliminated if desired because a self-contained unit will be provided.

Figure 3:
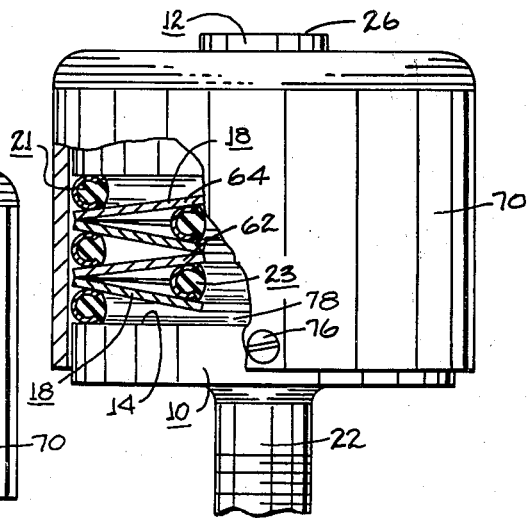
Fig. 3 is an elevational view, partly in section, illustrating the bellows construction of Figs. 1 and 2 in the fully deflected position.

Fig. 3 illustrates the position of the outer and inner load supporting and sealing assemblies 21 and 23 when the washer members 18 have been deflected axially to their maximum degree as by the application of a load to the plunger 26 which shifts the end plate 12 axially to the full extent of its travel, reached when the outer ends of the washer members 18 are in abutting relation with each other because at that time a solid load transmitting column is provided by the outer assemblies 21 and the contacting surfaces of the washer members 18 engaging each other at their outer and inner peripheries.

When it is desired to extend the plunger 26 outwardly with respect to the cup 70, fluid under pressure is introduced through the port 24 into the space 78 within the assembly. As the pressure increases within the chamber 78, force is exerted by the pressurized fluid urging the end plates 10 and 12 to move axially away from each other, thereby compressing the spring 68. Pressure is also exerted between the washer members 18 over the radial length of the washer extending from the central aperture 60 in the washers 18 to the upper and lower sealing surfaces 56 and 58 of the load supporting and sealing assemblies 20 at the point of contact with the upper and lower washer members 18 which they abut. This increase of pressure is readily sealed by the sealing ring member 28 because the surfaces of the washers contact the rounded upper and lower load carrying surfaces 50 and 52 of the members 34, and the radially outwardly directed force of the fluid under pressure merely urges the inner portion 54 of the sealing ring 28 into more intimate sealing relation with respect to the contacting surfaces of the washer members 18, and the inner surfaces 16 and 18 of the end plates 10 and 12.

In like manner fluid pressure exerted on the inner load supporting and sealing assemblies 23 urges the inner portion 54 of the sealing ring 28 into more intimate sealing engagement with the contacted surfaces of the washer members 18 adjacent the central aperture 60 in the washer members 18 thereby urging the sealing members toward the rounded upper and lower load carrying surfaces 50 and 52 of the inner assemblies 23.

It will be apparent that I have provided members 34 of the outer and inner assemblies 21 and 23 to support the load, and have provided sealing ring members 28 in the assemblies 21 and 23 to perform the sealing function. I thus isolate the load carrying function from the sealing function in such a manner that each element is permitted to perform its own function without interfering with the other and the load carrying rings 34 back up and support the sealing function of the sealing ring member 28 as well as carrying the load with no help from sealing means.

I have thus been able to isolate the sealing and the load carrying functions in an assembly which is balanced pressure-wise since the assembly is concentric with respect to the periphery of the washers, and the load carrying member supports the sealing member in such a manner that better sealing action results as the pressure within the space 78 inside of the assembly increases.

It will of course be apparent that the washer members 18 store up energy as they are deflected as they move from the normal positions to the fully loaded position illustrated in Fig. 3, and function in the same manner as a spring. The force exerted by the washer members resisting deformation of the washers is of course transmitted through the load carrying member 34 and the sealing ring members 28 do not in any manner interfere with the load carrying function of the load carrying member 34, nor the sealing function of the ring member 28, and vice versa.

The mechanical loading of the end plates 10 and 12 results in axial deflection of the washers 18. The washers 18 are deflected angularly as the end plates 10 and 12 move toward each other, the load carrying rings 34 maintaining the alternate outer and inner edges of the washers in predetermined axially spaced relation, and the sealing ring members 28 being urged toward the load carrying rings 34 by the pressure within the chamber 78. The load carrying and sealing functions of the assemblies are thus isolated from each other.

When the device is in the normal pre-loaded position illustrated in Fig. 2 the spring 68 exerts sufficient force on the sealing ring member 28 to maintain complete sealing of the assembly.

It will be apparent that the load or force exerted on the plunger 26 urging the washers 18 axially toward the deflected position is, in the embodiment illustrated, augmented by the force exerted by the spring 68 within the cup 70. These forces are opposed by the resistance of the washers 18 to deflection and by the fluid pressure exerted within the chamber 78. The sealing ring members 28 thus at all times maintain secure sealing of the chamber 78 because the sealing ring members 28 are urged radially toward the load carrying ring member 34. The mechanical loads are thus always in excess of the fluid loads, thereby ensuring adequate sealing.

Figure 4:
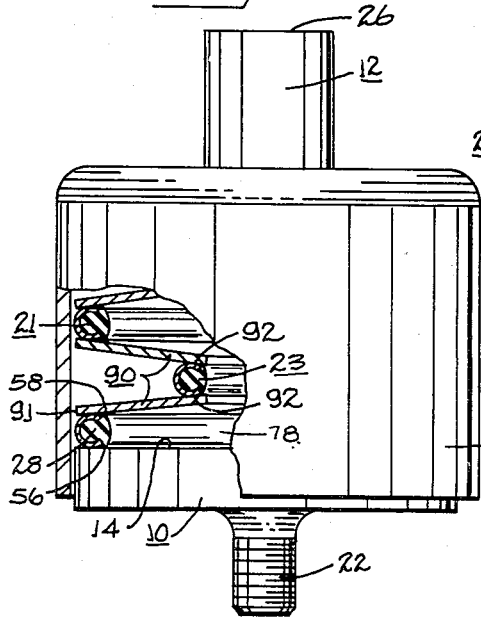
Fig. 4 is an elevational view, partly in section, illustrating the formation of a bellows employing Belleville spring washers, the assembly being shown in the normal pre-loaded position.

The embodiment of my invention illustrated in Fig. 4 is similar in many respects to that illustrated in Figs. 1 to 3. It will be noted that Belleville or conical washers are stacked in series, outer load supporting and sealing assemblies 21 being interposed between the opposed surfaces of the pair of adjacently positioned Belleville washers 90. Inner load supporting and sealing assemblies 23 are interposed between the opposed inner surfaces 92 of the Belleville washers 90.

In the assembly illustrated in Fig. 4, the device is shown in the partially deflected position with the normal pre-load applied. It will be noted that the upper and lower seating surfaces 56 and 58 of the sealing ring member 28 are deformed or deflected to intimately engage the surfaces of the Belleville washers 90 to ensure a good sealing action therewith.

Attention is directed to the fact that the position illustrated in Fig. 4 is the normal starting position of the useful working cycle of a bellows composed of Belleville-type washers. In like manner the position of the flat washers 18 illustrated in Fig. 2 is the normal starting point of the cycle of operation as applied to the flat washers.

As applied to a bellows formed of flat washers illustrated in Fig. 2 the normal working cycle is from the position illustrated in Fig. 2 to the fully deflected position illustrated in Fig. 3. As applied to the Belleville-type washers the normal cycle or stroke of the bellows device is from the position illustrated in Fig. 4 to a position where the Belleville washers 90 are deflected to a degree corresponding generally with the deflection of the flat spring washers in the normal pre-load position illustrated in Fig. 2. The Belleville-type washers 90 at the ends of their normal working cycle will assume a substantially flat position or even an angular position somewhat beyond the flat position.

It will be noted that in all of the embodiments of my invention thus far described, the sealing ring member 28 is positioned circumferentially inside of the load carrying member 34. This arrangement is for use where the space 78 within the bellows assembly is subjected to greater than atomspheric pressure.

Where the space 78 within the assembly is subjected to less than atmospheric pressure, the sealing ring member 28 should be positioned on the outside of the load carrying member 34 or the assembly 20 should be reversed so that as the atmospheric pressure exerted on the outside of the bellows assembly tends to exert a force on the bellows assembly it will urge the sealing ring member 28 radially inwardly and into sealing engagement with the load carrying ring 34 and the adjacent washer surfaces.

Referring now to Figs. 11 and 12, it will be noted that the sealing ring member 28 is positioned outside of the load carrying member 34.

Figs. 13 to 15 disclose a double-acting load supporting and sealing assembly wherein a second sealing ring is disposed adjacent a load carrying ring but on the side of it remote from the first sealing ring. As shown, a load carrying member 100 has upper and lower rounded contacting surfaces 102 and 104 and radially spaced inner and outer grooves 106 and 108 adapted to receive inner and outer sealing ring members 110 and 112 respectively, each formed in the manner illustrated and described in connection with the disclosures of Figs. 5 to 12 inclusive.

It will be apparent that in the use of my improved compound load carrying member 100 it is desirable that the upper and lower washer contacting surfaces 102 and 104 be disposed radially between the adjacent washer members in such a manner that the inner and outer sealing ring members 110 and 112 will engage the substantially flat confronting surfaces of the washer members so as to provide intimate sealing engagement therewith to prevent the escape of pressurized fluid either into or out of the space 78 within the assembly.

The operation of this embodiment of my invention will be apparent from the previous description, the purpose of this emobdiment being to provide a double-acting seal wherein the space within the bellows may be subjected alternately to either positive or negative pressure without danger of leakage occurring from the space within the bellows assembly.

In the foregoing forms of the invention, the load supporting rings and sealing rings are mechanically united to provide preformed units or sub-assemblies which will be recognized as having certain advantages, as from the standpoint of ready assembly with the washer members but it will be apparent that, in some applications, it may be desirable to dispense with such mechanical union, as in the forms now to be described.

For example, in the form illustrated in Figs. 16 and 17, the outer and inner load suporting rings 123, 125 and their rings 124, 126 are of solid, circular section (as to the sealing rings, that is, when in their relaxed state, as illustrated in Fig. 17 with respect to the outer or larger diameter rings). The adjacent side faces of the load supporting and sealing rings may be sealed or bonded to one another and the upper and lower faces of the sealing rings similarly sealed or bonded to the adjacent, opposed faces of the washer members and the components, whether bonded or not, assembled with washer members 122 between end plate members 120, 121 substantially as already described. Here, again, it will be understood that the washer members may be of the flat or Belleville type; and, as before, a shell or housing may be telescoped over the assembly and the washer, thereby suitably preloaded to engage the washer member peripheries with the load supporting rings and put the sealing rings under compression.

In each of the foregoing forms of the invention, as illustrated, both the inner and the outer peripheries of the pairs of washer members are sealed in the same manner but in some instances, as in small sizes of bellows where space is at a premium, it may be desirable to seal one set of peripheries (that is, inner or outer) in the manner described above and resort to a modified form of seal for the other set of peripheries. Thus, in the form illustrated in Figs. 18–20, the sealing rings of only one of the two sets or series (the outer, in this instance) abut the opposed faces of the washer members, as above described, and the sealing rings of the other (inner) series are disposed within the center openings of the washers, in overlapping relation to their inner edges.

As shown in these figures, both the load supporting rings 132, 134 and the sealing rings 133, 135 are of more or less oval form; that is, of greater height than thickness, with their major axes disposed parallel to the axis of the washer members. This form or section is particularly appropriate where the dimensions are required to be small, without impairing the ability of the washer members to deflect.

In the forms of the invention previously described, the bellows components are maintained in their correct stacked relation either by the preload compression or by such compression supplemented by such bonding as may be deemed desirable but mechanical means may be provided for locating at least some of the load supporting rings in relation to the washer peripheries; that is, against lateral displacement. This, too, is illustrated in the form of Figs. 18–20, where it will be seen that the inner peripheral portions of the washers members 130 are deformed axially to provide locating lips or shoulders 131 for the inner load supporting rings. As indicated, all of the washer members are so deformed and then assembled so that the lips project, alternately, up and down, to provide locating means both above and below each inner load supporting ring.

Fig. 18 illustrates three washer members of a typical assembly of this form using (in this instance) flat washer members and Fig. 19 illustrates the same under maximum deflection or compression. As is also illustrated in Fig. 3, it will be seen that the opposed outer peripheral portions of the pairs of washer members engaged by the load supporting rings of the smaller diameter engage each other under maximum deflection of the washer members and, in effect, serve as stops to limit the movement of the end plates toward one another. While such plates are not shown in Fig. 19, it will be understood that the form of assembly of that figure can be preloaded and housed in the same manner as the previously described forms.

The form of the invention shown in Figs. 18–20 is designed for use with greater than atmospheric pressure within the bellows and it will be noted that the internal pressure will serve to distort the inner sealing rings somewhat, as indicated in Fig. 19, to effect a tight seal across the inner edges of the washers 130.

In the usual case, both the washers and the load supporting rings will be made of metal but other materials may be appropriate in particular cases. It will be understood that the load supporting rings should be substantially incompressible, at least under the loads to be encountered, so that their upper and lower surfaces will serve effectively as pivot areas about which the washers may rock.

In the light of the foregoing exemplification of the principles of the invention, the following is claimed:

1. A bellows structure including the combination of a pair of axially deflectable washer members disposed one above the other; a concentric, intervening, load supporting ring of substantially incompressible material having a cross section presenting upper and lower surfaces abutting the opposed faces of the washer members adjacent a periphery of one of them and the corresponding periphery of the other; and a sealing ring of resilient material adjacent and concentric with the load supporting ring and having upper and lower portions abutting the said opposed surfaces of the washer members, the said upper and lower portions of the sealing ring, in the relaxed state of such ring, protruding above and below the said upper and lower surfaces of the load supporting ring whereby, when one of the washers is deflected in a direction to approach the other, with the said opposed faces of the washer members abutting the said upper and lower surfaces of the load supporting ring, the sealing ring is compressed.

2. The combination of claim 1 in which both the load supporting ring and the sealing ring are disposed wholly between the opposed faces of the washer members.

3. The combination of claim 1 including a third washer member disposed above the said pair; an additional concentric, load supporting ring of substantially incompressible material having upper and lower surfaces abutting the opposed faces of the third washer member and the upper washer member of the pair adjacent their other peripheries; and a resilient sealing ring in sealing engagement with said third and upper washer members adjacent the said additional load supporting ring.

4. A bellows comprising upper and lower end plate members movable toward one another and, between them, a plurality of washer members; a concentric, load supporting ring of substantially incompressible material disposed between each of said members and its adjacent member, with upper and lower surfaces of each ring abutting opposed faces of the adjacent members, the said rings being of different diameters and disposed, alternately, adjacent the outer and inner peripheries of the washer members; a series of resilient sealing rings of which one is disposed adjacent each load supporting ring of the larger diameter; a second series of resilient sealing rings of which one is disposed adjacent each load supporting ring of the smaller diameter; the sealing rings of at least one of the two series having upper and lower surfaces located between and in sealing engagement with the opposed faces of their adjacent members and the sealing rings of the other of the said series also being in sealing engagement with their adjacent members.

5. The combination of claim 4 including means associated with the said upper and lower end plates for preloading the washer members.

6. The combination of claim 4 including means for locating at least some of the load supporting rings with respect to the peripheries of the washer members.

7. The combination of claim 4 in which peripheral portions of at least some of the washers are deformed axially to provide locating shoulders for the load supporting rings abutting them and in which the sealing rings adjacent such load supporting rings are disposed in overlapping relation to the edges of such washers.

8. The combination of claim 1 in which the sealing ring engages and is bonded to a side face of the load supporting ring.

9. The combination of claim 1 in which the load supporting ring is of hollow section with an open side and in which a portion of the sealing ring is clamped within such ring.

10. The combination of claim 1 in which the load supporting ring is of oval section with its major axis disposed parallel to the axis of the washers.

11. The combination of claim 4 in which the opposed, outer peripheral portions of the pairs of washer members engaged by the load supporting rings of the smaller diameter constitute stops to limit movement of the end plates toward one another.

12. The combination of claim 1 in which a second sealing ring of resilient material is disposed adjacent the load supporting ring but on the side of it remote from the first mentioned sealing ring.

13. The combination of claim 1 in which the load supporting ring is of substantially C-shaped cross section.

14. A bellows having a top and bottom, an expansible bellows portion between the top and bottom, said portion comprising a stack of washers disposed in concentric relation, means for joining pairs of said washers together along continuous surfaces immediately adjacent their outer edges, means for joining other pairs of said washers along continuous surfaces immediately adjacent their inner edges, the lower member of each of said first named pairs comprising the upper member of an adjacent other pair, said first named means including a ring having a mean diameter substantially the same as the outer diameter of said washers and disposed between the washers comprising said first named pairs, sealing means of slightly less diameter than said rings and disposed inwardly adjacent thereto and sealed to said rings and to the immediately adjacent surfaces of said washers, said second named joining means comprising rings having an outer diameter greater than the inner diameter of said washers, and sealing means of slightly less diameter than said last named rings and disposed inwardly adjacent thereto and sealed to said last named rings and to the immediately adjacent surfaces of said washers.

References Cited in the file of this patent

UNITED STATES PATENTS

| | | |
|---|---|---|
| 1,180,947 | Scott | Apr. 25, 1916 |
| 1,806,009 | Whiteacre | May 19, 1931 |
| 1,997,565 | Arbuckle | Apr. 16, 1935 |
| 2,161,719 | Hay | June 20, 1939 |
| 2,482,449 | Wells | Sept. 20, 1949 |
| 2,577,908 | Nakken | Dec. 11, 1951 |
| 2,708,110 | Clay | May 10, 1955 |

FOREIGN PATENTS

| | | |
|---|---|---|
| 727,414 | Germany | July 30, 1943 |